H. R. SPANGLER.
TIRE PRESSURE INDICATOR AND ALARM.
APPLICATION FILED MAY 23, 1921.
1,398,449. Patented Nov. 29, 1921.
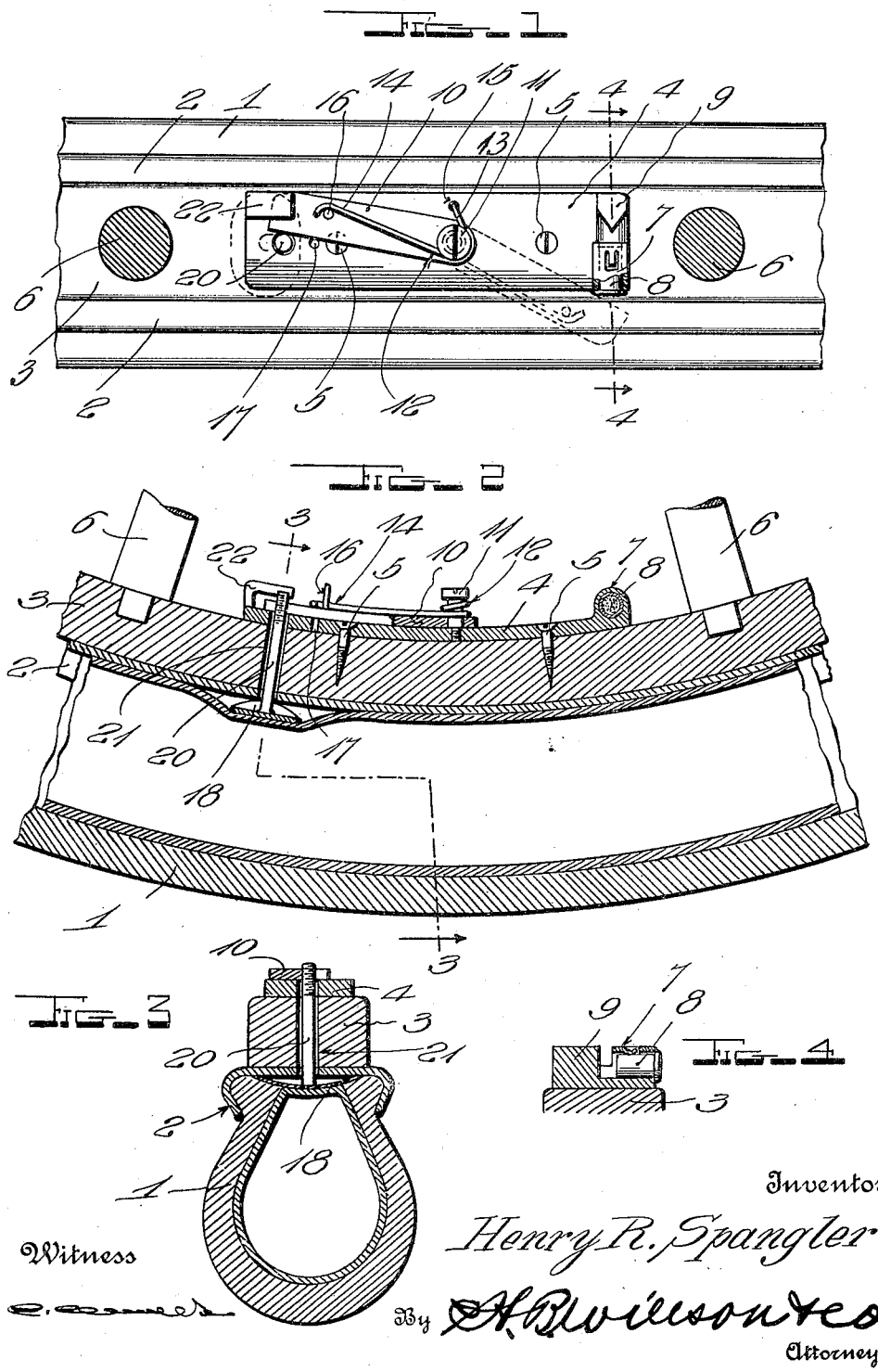

UNITED STATES PATENT OFFICE.

HENRY ROY SPANGLER, OF PUEBLO, COLORADO.

TIRE-PRESSURE INDICATOR AND ALARM.

1,398,449.  Specification of Letters Patent.  Patented Nov. 29, 1921.

Application filed May 23, 1921. Serial No. 471,769.

*To all whom it may concern:*

Be it known that I, HENRY R. SPANGLER, a citizen of the United States, residing at Pueblo, in the county of Pueblo and State of Colorado, have invented certain new and useful Improvements in Tire-Pressure Indicators and Alarms; and I do declare the following to be a full, clear, and exact description of the invention, such as will enable others skilled in the art to which it appertains to make and use the same.

This invention relates to an improved device for use in connection with a pneumatic tire and one object of the invention is to provide a device so constructed that it may serve as a pressure indicating gage thus preventing the tire from being overinflated and further serve as an alarm which will indicate when the pressure has been reduced beyond a desired point.

Another object of the invention is to so construct this device that a blank cartridge may be exploded when the pressure has been reduced beyond a desired point and thus provide an audible signal which can be heard by the occupant of a closed car.

Another object of the invention is to provide a signal of the character described so constructed that the pressure indicating gage pin may also serve as the trigger pin for releasably holding a cartridge exploding arm in a set position, the pressure indicating pin releasing the firing arm so that it may be swung into operative engagement with a cartridge when the pressure is reduced beyond the desired point.

Another object of the invention is to provide a device of the character described which may be easily connected with a standard construction of wheel rim and felly.

Another object of the invention is to provide a device of the character described which will be simple in construction and very effective in operation.

This invention is illustrated in the accompanying drawings, wherein:

Figure 1 is a plan view showing the device applied to a portion of a wheel.

Fig. 2 is a longitudinal sectional view through the structure of Fig. 1.

Fig. 3 is a transverse sectional view taken along the line 3—3 of Fig. 2.

Fig. 4 is a fragmentary sectional view taken along the line 4—4 of Fig. 1.

This improved indicator and signal is used in connection with a pneumatic tire 1 which is mounted upon the usual rim 2 carried by the felly 3 of the wheel. This device is provided with a base plate 4 which is secured upon the felly of the wheel by screws or other suitable fasteners 5 and extends circumferentially of the wheel between two of the spokes 6. Adjacent one end of the base plate, there has been provided a cartridge holding cylinder or barrel 7 for receiving a blank cartridge 8. In order to prevent danger of a loaded bullet being placed in the barrel 7, there has been provided an abutment block 9 which is positioned close enough to the inner end of the barrel to engage a bullet and prevent the bullet from being properly seated in the barrel. From an inspection of Fig. 1, it will be noted that this block has its inner end portion cut from opposite sides so as to provide deflecting surfaces which will prevent injury to people standing near the wheel. From an inspection of this Fig. 1, it will be readily seen that the wadding and gases from the exploded blank cartridges will be caused to spread instead of passing straight out from the cartridge.

This cartridge is to be exploded when the pressure within the tire is reduced beyond a desired point and in order to do so, there has been provided a hammer arm 10 which is pivotally mounted by means of a screw 11. A spring 12 is mounted upon the screw 11 and has a short arm 13 and a longer arm 14, the arm 13 being provided with a bent end which fits into an opening 15 formed in the base plate 4 and the arm 14 having a bent end portion which engages a pin 16 carried by the hammer arm 10. It will thus be seen that the spring will serve to swing the hammer arm into engagement with the rim of the cartridge as indicated by dotted lines in Fig. 1 and when so moved, will cause the cartridge to be exploded. An opening 17 is provided for the base plate into which a temporary pin may be placed to hold the hammer arm in the position of Fig. 1 while the tire is being inflated.

The trigger mechanism for this alarm and pressure indicator consists of a spring 18 which is curved longitudinally so that when the tire is expanded by air under pressure, the pin 20 may be forced outwardly through the opening 21 in the felly for engaging the edge of the hammer strip 10 and releasably hold the hammer in the position of Fig. 1 with the free end portion of the hammer extending beneath the guard 22 thus preventing the hammer from being taken out of engagement with the trigger pin by vibration when going over rough roads. This trigger pin 20 will be provided with scale markings as shown in Fig. 3 so that the amount of pressure may be readily ascertained by reading the scale markings. When the tire is inflated the proper amount, the trigger pin will extend in front of the hammer arm but when the pressure is reduced beyond the desired amount, the resiliency of the spring 18 will cause this spring to move and draw the pin 20 inwardly out of an operative position. The hammer arm will then be released and the spring which engages this hammer may swing the hammer upon its pivot so that it will move to the dotted line position of Fig. 1 and strike the rim of the cartridge thus causing the cartridge to be exploded and giving an audible signal which will warn the driver of the car that one of the tires needs repumping. By providing the block 9, the wad and gases will be prevented from moving straight out from the cartridge and therefore there will be no danger of a person standing near the automobile being injured. A very efficient device has thus been provided which will be simple in construction and easy to install.

I claim:

1. A tire pressure indicator and alarm comprising a base plate, a cartridge carrier carried by the base plate, a hammer pivotally connected with the base plate, a spring for swinging the hammer into operative engagement with a cartridge carried by the cartridge carrier, a resilient strip adapted to be acted upon by an inflated tire, a gage pin carried by the resilient strip for extending through the felly of a wheel and through the base plate into position to releasably hold the hammer in a set position, and a guard carried by the base plate for engaging the hammer and holding the hammer against movement out of engagement with the pin while engaged by the pin.

2. A tire pressure indicator and alarm comprising a base, a cartridge carrier carried by said base, a hammer pivotally connected with said base, resilient means for swinging the hammer into operative engagement with a cartridge carried by said cartridge carrier, and trigger means yieldably held in an inoperative position and moved by pressure of an inflated tire to a position for holding the hammer in an inoperative position, said trigger means constituting a pressure gage for the tire.

3. A tire pressure indicator and alarm comprising a base, cartridge carrying means carried by said base, a hammer element movably carried by said base, a trigger element for releasably holding the hammer element in an inoperative position, the trigger element being yieldably held in an inoperative position and moved to an operative position by pressure of an inflated tire, and a guard carried by the base for engaging the hammer and holding the hammer against movement out of engagement with the trigger while engaged by the trigger.

In testimony whereof I have hereunto set my hand.

HENRY ROY SPANGLER.